M. McVICAR.
Apparatus for Teaching in Schools.

No. 141,369.    Patented July 29, 1873.

WITNESSES.                                                INVENTOR.

UNITED STATES PATENT OFFICE.

MALCOLM McVICAR, OF POTSDAM, NEW YORK.

IMPROVEMENT IN APPARATUS FOR TEACHING IN SCHOOLS.

Specification forming part of Letters Patent No. 141,369, dated July 29, 1873; application filed April 28, 1873.

*To all whom it may concern:*

Be it known that I, M. McVICAR, of Potsdam, county of St. Lawrence and State of New York, have invented certain new and useful Improvements in Apparatus for Teaching in Schools, of which the following is a specification:

The nature of my invention relates to an improvement in apparatus for teaching in schools; and it consists in a frame having a suitable opening through its center for exposing cards or objects to view, upon each side of which are arranged a set of independent slide-bars, which can be so arranged that either set will entirely or partially hide the object or card from view. Sliding in a groove back of this opening and two sets of slide-bars, is a large slide-frame, made of slats with spaces between them to receive objects, and which is also used for moving the card before the opening, so as to expose any part of it at a time.

Figure 1:
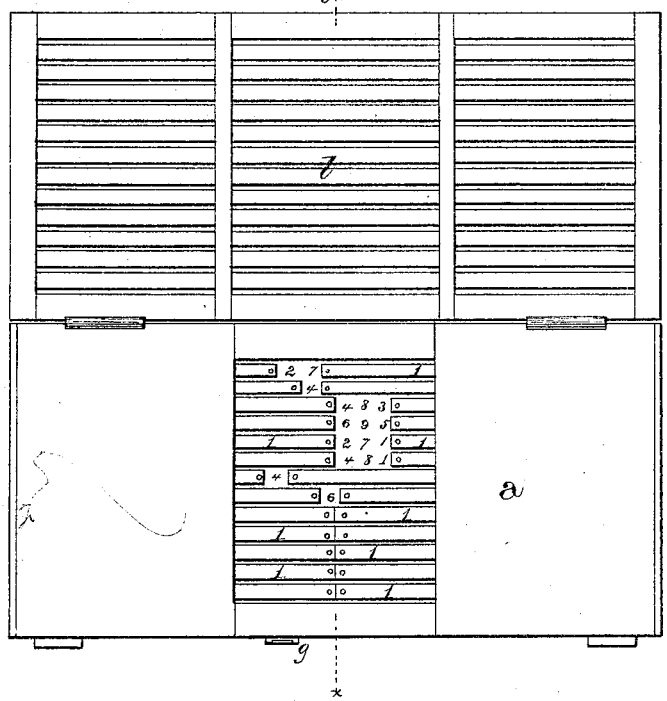
Figure 2:
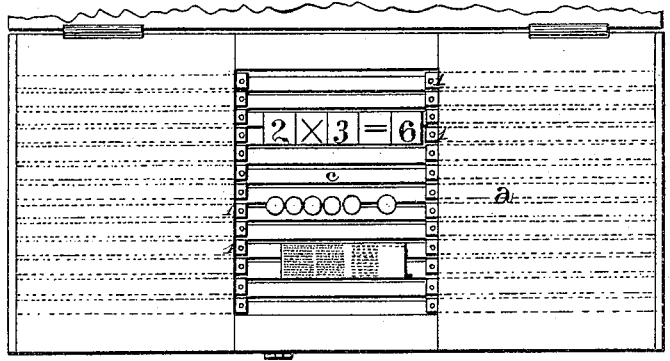
Figure 3:
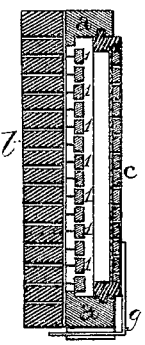

Figure 1 is a front elevation of my invention, the two sets of slide-bars being arranged so as to cover and expose various parts of the card. Fig. 2 is a similar view, the two sets of independent slide-bars being moved back, and the large slide-frame being provided with various designs for object-teaching. Fig. 3 is a vertical cross-section on the line $x\ x$, Fig. 1.

$a$ represents the frame, made of any desired shape or size, and having a suitable opening made through its front for exposing cards or objects to view. Upon each side of this opening is arranged a set of independent slide-bars, which consist of narrow slats 1, and which can be moved back and forth over the opening, so that either set alone, or both combined, may be used for hiding or exposing any desired portion of the card presented for view, as shown in Fig. 1. Sliding in grooves in the upper and lower parts of the frame is a slide-frame, $c$, composed of narrow slats with spaces between them for the insertion of various designs used in object-teaching. This slide is provided with grooves for the reception of the cards or other printed matter being exposed to view, and by means of the handle $g$ can be moved back and forth so as to bring a portion or the whole of the card at once before the opening. Hinged to the top of the frame $a$ is a frame, $l$, composed of narrow slats, and adapted to receive various devices and designs for object-teaching, and which, when used in connection with the frame $a$, is raised up, as shown in Fig. 1; but while used alone it swings down in front of the frame, as shown in Fig. 3, in both cases exposing the objects to the view of the class.

Having thus described my invention, what I claim as new, and desire to secure by Letters Patent, is—

1. In apparatus for teaching in schools, the slide-frame $c$, constructed substantially as described, and adapted for presenting either cards, letter-blocks, or other objects before the opening, as specified.

2. An apparatus for teaching in schools, consisting of the frame $a$, hinged slat-frame $l$, slide-bars 1, and slide-frame $c$, substantially as described.

In testimony that I claim the foregoing as my invention I hereunto affix my signature.

MALCOLM McVICAR.

Witnesses:
E. D. BLAKESLEE,
HENRY P. EMERSON.